June 9, 1936.   F. T. BAUMES   2,043,223
SIPHONPROOF GASOLINE TANK
Filed May 18, 1935
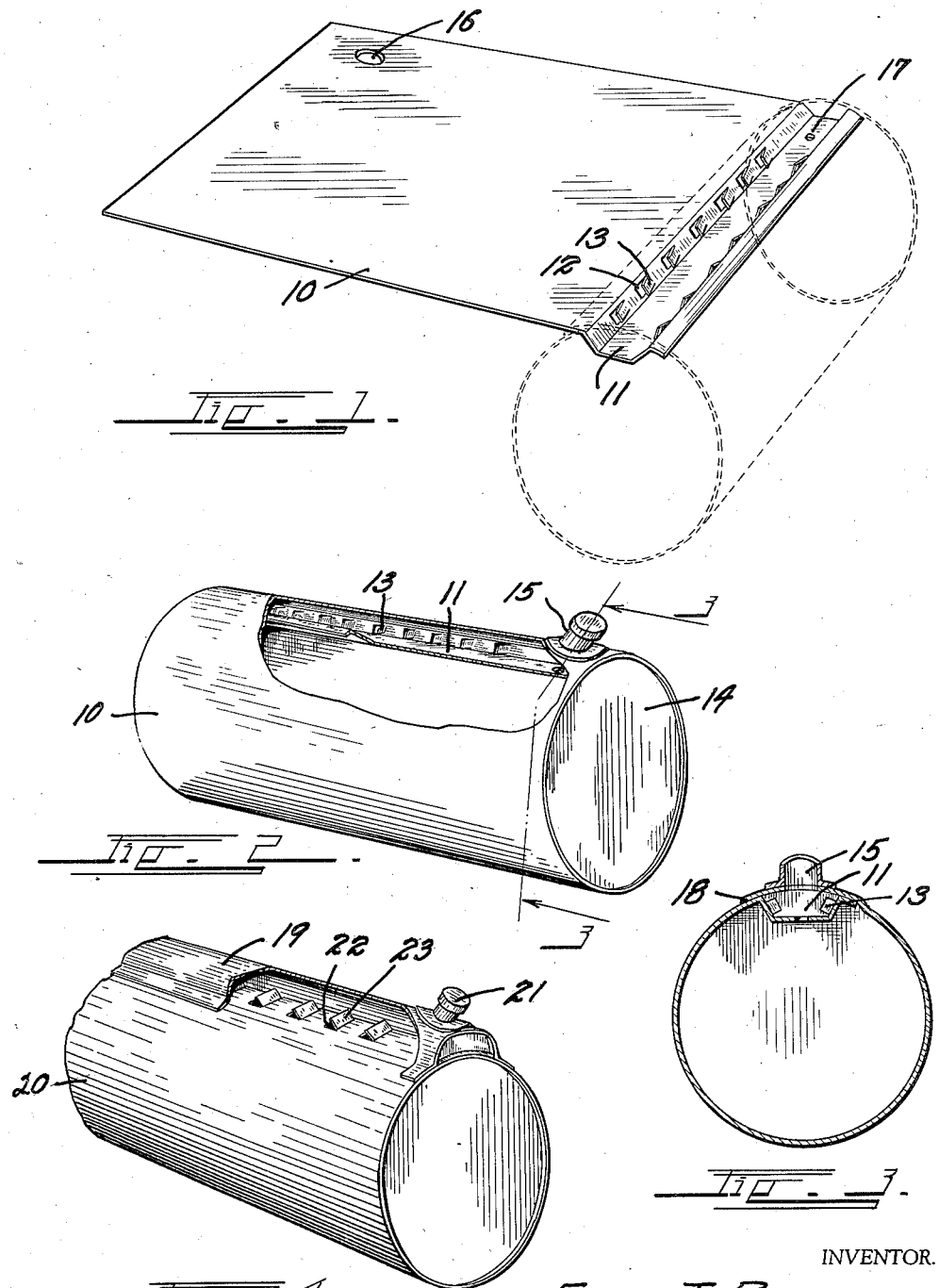
INVENTOR.
FLOYD T. BAUMES
BY
ATTORNEY.

Patented June 9, 1936

2,043,223

UNITED STATES PATENT OFFICE 2,043,223

SIPHONPROOF GASOLINE TANK

Floyd T. Baumes, Denver, Colo.

Application May 18, 1935, Serial No. 22,150

5 Claims. (Cl. 220—86)

This invention relates to a gasoline tank for automobiles, and has for its principal object a provision of a tank construction which will absolutely prevent unauthorized siphoning of gasoline from the tank.

Another object of the invention is to provide a unitary tank structure for this purpose which can be cheaply and easily manufactured and which will eliminate all separate parts and attachments.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:—

Fig. 1 is a perspective view of the sheet metal tank plate before it is bent to the tank shape.

Fig. 2 is a perspective view of the completed tank partially broken away to show the interior construction.

Fig. 3 is a cross section therethrough, taken on the line 3—3, Fig. 2.

Fig. 4 is a fragmentary perspective view of an alternate form of the invention.

The invention contemplates forming an automobile gasoline tank from a rolled tank plate 10 into the roll of which end plates 14 are soldered, crimped, welded or otherwise attached. The side plate 10 is perforated and shaped before being rolled, as shown in Fig. 1. Along one of the lateral edges a depressed groove or channel 11 is formed. The sides of this channel are perforated as shown at 12, the perforations being protected by flaps 13. The perforations and flaps are formed by cutting U-shaped cuts from the metal and bending the tongues thus formed inwardly. A filling opening 16 is also formed in the plate.

In forming the tank, the sheet 10 is rolled around, as indicated in broken line in Fig. 1, until the forward edge overlaps the channel 11, so as to form a top for the latter. This edge is then welded, soldered or otherwise secured to the plate 10, as indicated at 18, Fig. 3. The ends 14 are then put in place to close the tank and the channel 11. This forms a complete closed tank with the channel 11 extending throughout the length of the tank. The channel is positioned immediately below the filling hole 16 to which a filling nipple 15 is attached.

It can be readily seen that gasoline flowing into the tank through the nipple 15 will flow along the channel and quickly disperse into the tank through the plurality of openings 12. It can also be seen that any attempt to force a siphon hose or pipe into the tank will be frustrated by the channel 11. The siphon hose will simply travel along the channel and can not enter the openings 12 because of the flaps 13, all of which are turned away from the filling nipple.

If desired, a very small gauge hole 17 may be placed in the bottom of the channel 11 immediately below the nipple 15. This hole will allow the insertion of a small rod to act as a depth gauge, and will also act to completely drain the channel 11.

In Fig. 4, an alternate form of the invention is illustrated applied to a tank 20. In this form, a projecting ridge or chamber 19 is formed along the top of the tank 20 and sealed to the tank wall. The chamber 19 is provided with a filling nipple 21. The wall of the tank 20 within the chamber 19 is perforated with holes 22 and protected by bent flaps 23. The action of the alternate form is similar to that of the preferred form. Its construction, however, allows it to be placed on pre-formed tanks whereas the preferred form is built into the tank and is unitary therewith.

While the invention has been shown applied to a cylindrical tank, it is of course not limited to this particular shape but will function equally well regardless of the tank shape.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A siphon-proof gasoline tank structure comprising: a horizontally disposed tank; a horizontal channel extending substantially the full length of said tank along the top thereof and provided with openings communicating between said channel and said tank; flaps extending partially over said openings and a filling nipple opening to said channel, said flaps extending away from said filling nipple.

2. A siphon-proof tank comprising: end walls; a continuous side wall plate joining said end walls and forming the enclosing side walls of said tank, the longitudinal edges of said side wall plate overlapping each other to form a double thickness along the top of said tank; a longitudinal channel in one of said overlapped edges, said channel being covered by the other overlapped edge; and a filling nipple communicating with said channel, there being openings communicating between said channel and said tank.

3. A siphon-proof tank comprising: end walls; a continuous side wall plate joining said end walls and forming the enclosing side walls of said tank, the longitudinal edges of said side wall plate overlapping each other to form a double thickness along the top of said tank; a longitudinal channel in one of said overlapped edges, said channel being covered by the other overlapped edge; a filling nipple communicating with said channel, there being openings communicating between said channel and said tank; and flaps positioned between said openings and said nipple to prevent a siphon hose from being passed from the nipple through the openings.

4. A siphon-proof tank comprising: end walls; a continuous side wall plate joining said end walls and forming the enclosing side walls of said tank, the longitudinal edges of said side wall plate overlapping each other to form two overlapping portions; a longitudinal channel indented inwardly in the inner overlapping portion, the outer overlapping portion forming a cover for said channel and being secured at its extreme edge to said inner overlapping portion; a filling nipple communicating through said outer overlapping portion with said channel, there being openings through the side walls of said channel communicating with the interior of said tank.

5. A siphon-proof tank comprising: end walls; a continuous side wall plate joining said end walls and forming the enclosing side walls of said tank, the longitudinal edges of said side wall plate overlapping each other to form two overlapping portions; a longitudinal channel indented inwardly in the inner overlapping portion, the outer overlapping portion forming a cover for said channel and being secured at its extreme edge to said inner overlapping portion; a filling nipple communicating through said outer overlapping portion with said channel, there being openings through the side walls of said channel communicating with the interior of said tank; and a flap positioned adjacent each opening toward said filling nipple.

FLOYD T. BAUMES.